Figure 7:
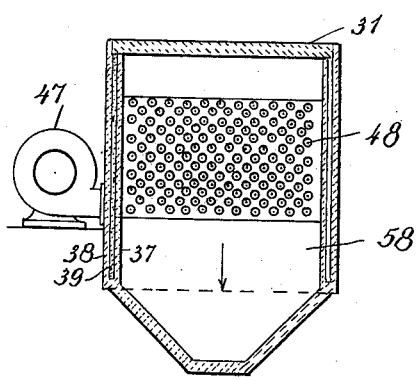
Figure 6:
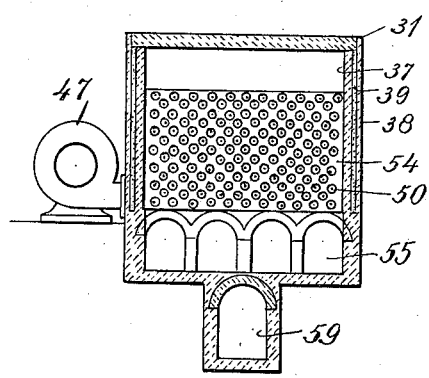

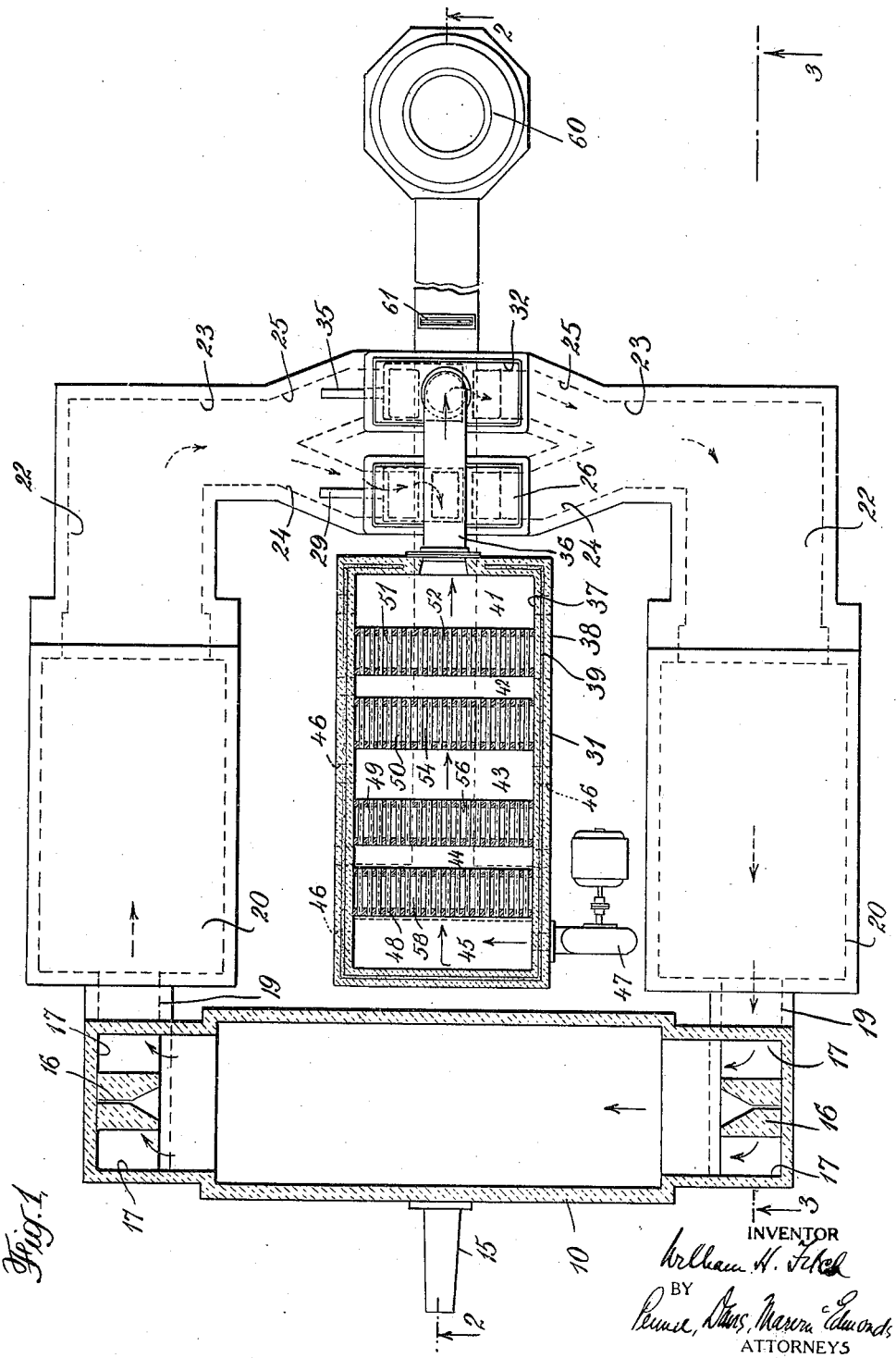

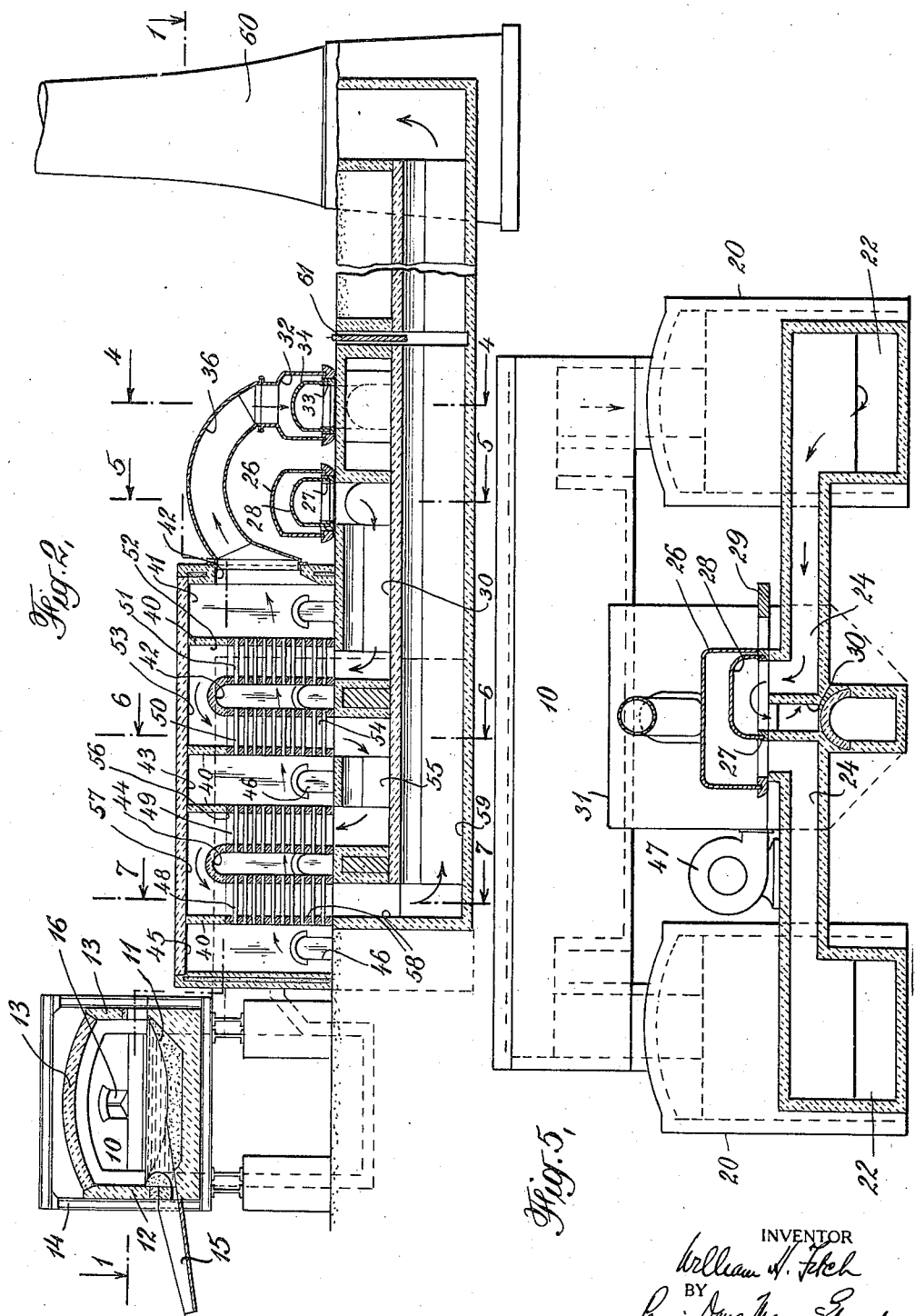

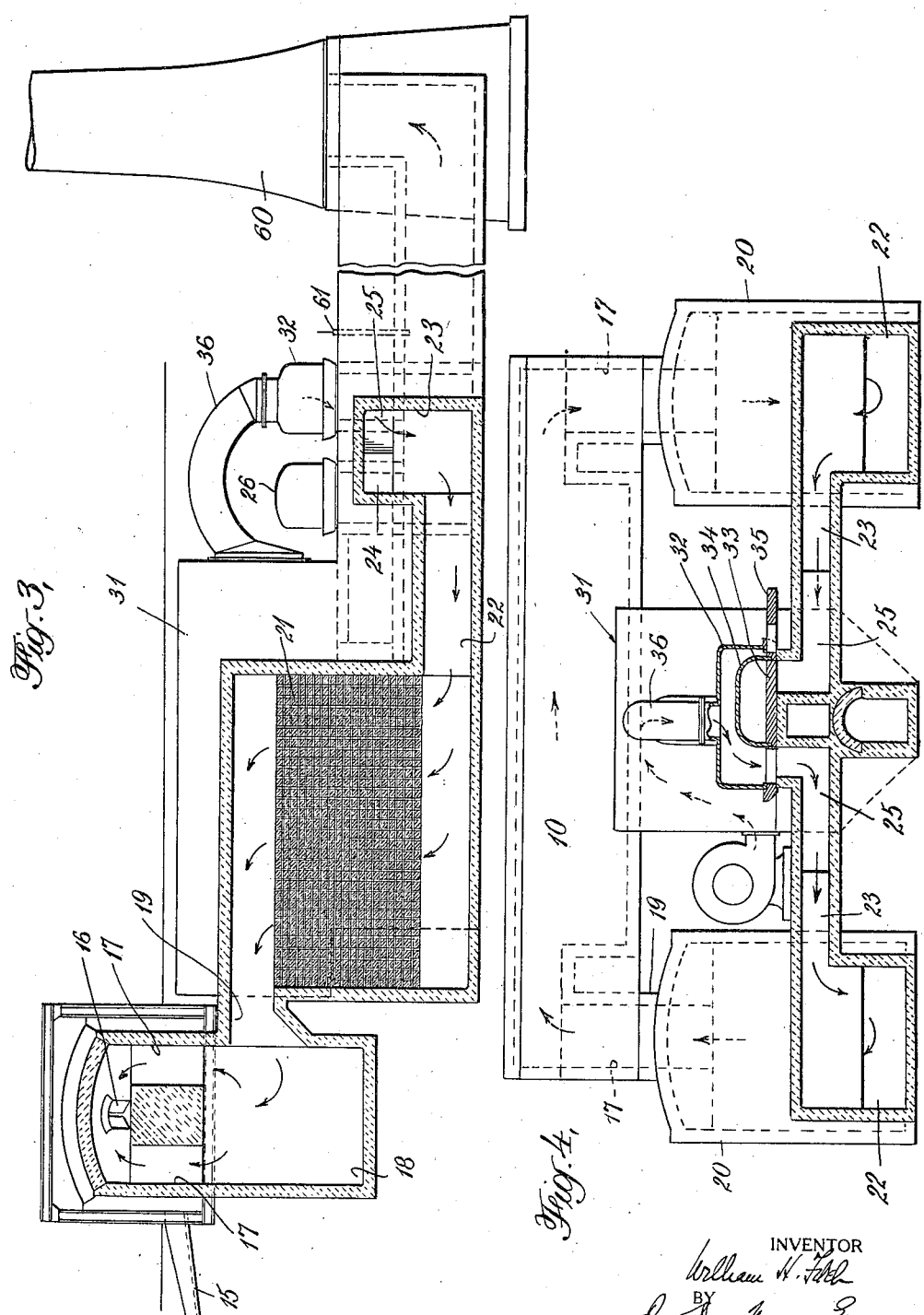

Nov. 12, 1929.　　　W. H. FITCH　　　1,735,607
HEATING FURNACE
Filed Dec. 18, 1926　　4 Sheets-Sheet 4

INVENTOR
William H. Fitch
BY
Pennie, Davis, Marvin & Edmonds
ATTORNEYS

Patented Nov. 12, 1929

1,735,607

UNITED STATES PATENT OFFICE

WILLIAM H. FITCH, OF ALLENTOWN, PENNSYLVANIA

HEATING FURNACE

Application filed December 18, 1926. Serial No. 155,594.

This invention relates to furnace installations of the reversing type and is concerned more particularly with an open hearth furnace installation provided with a recuperative device for recovering the heat carried from the furnace chamber by the waste gases, this heat being used in the device to raise the temperature of the air for combustion supplied to the furnace chamber.

In open hearth furnace operation it has been standard practice heretofore to recover the waste heat carried away from the furnace chamber in regenerators, and in some cases for further economy waste heat boilers are used in addition to the regenerators. In many installations waste heat boilers are not used because it is more economical to generate steam in a steam plant of the mill, but when waste heat boilers are not used, the furnace efficiency falls because the regenerators do not recover all of the heat in the waste gases, and thus there is a considerable heat loss. In some furnaces now in service including only regenerators, these structures are used for preheating both the air and gas and are provided with bricks laid in checker formation which are alternately raised to a high temperature by the passage of the waste gases from the furnace, and then give up their heat to the air and gas which is supplied for firing the furnace. The checker volume in such regenerators varies in accordance with the rated capacity of the furnace and the weight of the metal tapped. For most economical practice this volume is quite considerable so that when many of the present installations were built a compromise was arrived at between the size of the regenerators and the cost of building them, since heretofore the cost of fuel and labor has been such that maximum furnace efficiency has not been demanded. The amount of floor space which such regenerators occupy is also an important item in the manufacturing cost of the product.

Where fuels of higher calorific value are employed, such as coke oven gas, fuel oil, and the like, the fuel does not require preheating, but the preheating of the air for combustion is still necessary for economic reasons. In such an installation both the gas and air regenerators formerly used may now be used for air only, thus substantially increasing the temperature at which the air is admitted. Even in such installations the total heating surface ordinarily employed does not give the desired economical result because the checker volume necessary to recover the entire amount of heat which it is practicable to recover is so great that it is physically impossible in most installations to provide checker volume of the desired extent. Consequently, the loss of heat in such installations is a serious disadvantage.

The present invention is directed to the provision of a furnace installation in which these difficulties are overcome and in which the recovery of the waste heat in the gases from the furnace is efficiently and economically carried on, so that the cost of furnace operation is materially reduced. In order to accomplish this object, the installation of the present invention includes in addition to the usual furnace, a pair of regenerators which are insufficient in themselves to preheat the air for combustion to the desired extent. Associated with these regenerator chambers is a recuperator in which the air for combustion and the hot waste gases are caused to flow in heat transfer relationship. This recuperator is so constructed that a total heat recovery per unit volume is secured far superior to that obtained in a regenerator of standard checker work construction, so that in this installation the desired effect is obtained in a relatively small floor space, and the cost of building and maintaining the structure is greatly reduced.

In this recuperator, the air and hot gases are caused to flow through passages in which the air and gases are separated by walls through which an effective heat transfer may take place, and the efficiency of the heat recovery is to a considerable extent increased by the use of the regenerators which act not only to absorb heat from the waste gases for return to the incoming air in the usual way, but also to clean or scrub these gases, so that the solid material entrained by the gases is not deposited on the surface of the heat transfer elements in the recuperator with a resultant loss of efficiency.

In the arrangement which I prefer to employ, the furnace is of the reversing type, and is provided with a burner at each end, these burners being used in alternation. At each end of the furnace is a duct or flue which leads to a regenerator, and these regenerators are connected to one end of the recuperator chamber by ducts. These ducts lead to gas passages in the recuperator and control means in the form of valves are provided, so that the regenerators may be connected in alternation to these gas passages. Within the recuperator are also passages for air for combustion, the air flowing through the recuperator in a direction opposite to the direction of gas flow and being then led to the ducts which lead to the regenerators. In the connections between the air passages and the ducts are control means, such as valves, which may be manipulated so that the air passages may be connected to one regenerator while the gas passages are connected to the other. Blower means may be provided for supplying air to the air passages of the recuperator at the end opposite to that from which the air passes to the recuperators, and at this same end the gases leave the recuperator and pass to a stack. With this arrangement, the air and gases flow through the recuperator always in the same direction, but at one period in the furnace operation when the furnace is being fired from one end, the air flows through the regenerator connected to the firing end of the furnace and the gases flow from the opposite end of the furnace through the other regenerator to the recuperator. Then, when the direction of firing is reversed, the control devices are manipulated to bring about a reversal of flow of the air and gases with respect to the regenerators.

Figure 8:
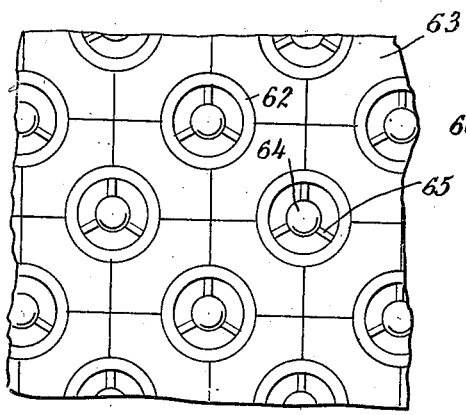
Figure 9:
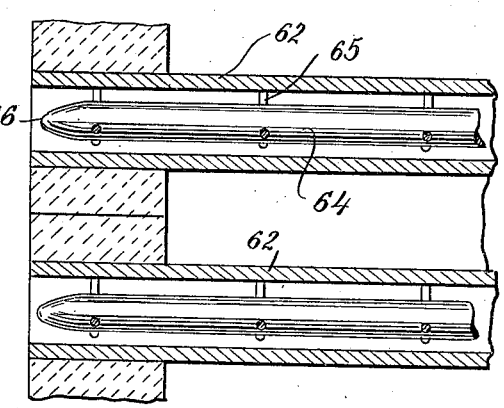

For a better understanding of the invention, reference will be made to the accompanying drawings, in which Fig. 1 is a plan view partly in section on the line 1—1 of Fig. 2 of a furnace installation constructed in accordance with the principles of the present invention; Fig. 2 is a sectional view on the line 2—2 of Fig. 1; Fig. 3 is a sectional view on the line 3—3 of Fig. 1; Figs. 4, 5, 6, and 7 are sectional views on the lines 4—4, 5—5, 6—6, and 7—7, respectively of Fig. 2; Fig. 8 is an enlarged fragmentary view of a wall in the recuperator, showing the manner in which the heat transfer tubes or elements are mounted in place, and Fig. 9 is a fragmentary sectional view showing a portion of certain of these tubes in section.

Referring now to the drawings, the installation is shown as consisting of a furnace chamber 10 which may be of standard construction and contains a hearth 11 with side walls 12 and arch 13, the structure being supported by means of buck stays 14. A spout 15 is disposed in the front wall of the furnace for tapping the metal. At each end of the furnace is provided a burner conventionally illustrated at 16 for the introduction of fuel which may be artificial or natural gas, pulverized coal, or any fuel suitable for the purpose. Adjacent each burner ducts 17, 17 are provided which lead downwardly below the hearth level into a dust chamber 18 and from a point near the top of this dust chamber leads a duct 19 to a regenerator 20.

These regenerators are of standard construction and include checker work 21 of any standard type. At the bottom, each regenerator is connected by a duct 22 to a flue 23 which is divided to form branches 24 and 25. The branch 24 leads to a valve housing 26 provided with a slide 27 carrying a D-valve 28. This slide is provided with a handle 29 and by moving the slide to the position illustrated in Fig. 5, it will be seen that the upper regenerator shown in Fig. 1 is connected through the valve to the duct 30 leading to the recuperator housing 31. The branch 25 leads to a similar valve housing 32 illustrated in Fig. 4, this housing having a slide 33 carrying a D-valve 34, the slide being provided with a handle 35 and the top of the housing being connected by an air duct 36 to the recuperator housing 31. By suitably positioning the slide 33 the air duct 36 may be connected to one or the other of the branch ducts 25 and in the illustrated construction, the valve 32 is set so that air from the housing 31 may flow through duct 36, through the valve housing, the lower branch 25 (Fig. 1) into ducts 23, 22 and regenerative chamber 20.

The recuperator is a structure made up of suitable walls which may consist of a refractory lining 37 and outer walls 38, between which is an intermediate layer of insulating material 39. This recuperator chamber is sub-divided by walls 40 into a series of chambers 41, 42, 43, 44 and 45, each of which is provided with means of access, such as a door 46. The first chamber 41 in the series is provided with an outlet 42 leading to the air duct 36 and this chamber is relatively wide. It serves for inspection and replacement of the heat transfer elements which take the form of tubes. The next chamber 42 is spaced from the chamber 41 and is comparatively narrow, this chamber providing space for inspection only of the elements. The wide and narrow chambers alternate with each other from one end of the series to the other, and the last chamber 45 is the air inlet chamber into which air may be introduced in any suitable manner, as, for instance, by means of the power-driven blower 47, the outlet of which is connected to the chamber 45 through a wall thereof.

Between adjacent walls of the chambers 45 and 44 is a bank of heat transfer elements or tubes 48, these tubes providing a means for a flow of air from chamber 45 to chamber 44. The chamber 44 is similarly connected by a second bank of tubes 49 with chamber 43, and a bank of tubes 50 leads from this chamber to the chamber 42. A final bank of tubes 51 connects the chamber 42 with the chamber 41. The several chambers 41 to 45 are spaced apart to provide passages between adjacent walls for the gases from the duct 30, these gases flowing upwardly through the duct 52 between chambers 41 and 42, to the space 53 between the top of the recuperator chamber and the top of the chamber 42. It will be observed that the narrow chambers 42 and 44 are of less height than the wide chambers 41, 43, and 45, so that the gases may flow around the tops of chambers 42 and 44 so as to flow past the next successive bank of tubes. The gases from the chamber 53 above the top of chamber 42 flow downwardly in the duct 54 between chambers 42 and 43, entering the longitudinal duct 55 and flowing in this duct beneath chamber 53 to the duct 56 between chamber 43 and chamber 44. The gases then flow through the chamber 57 leading around the end of chamber 44 and downwardly through the duct 58 between chambers 44 and 45 into the flue 59 which extends longitudinally beneath the recuperator to the stack 60, a gate valve 61 being provided in this flue so that the rate of flow may be controlled.

The banks of tubes 48, 49, 50, and 51 are made up of individual tubes 62, illustrated in Fig. 9, the ends of these tubes extending through defining walls of adjacent chambers. These walls may be made of tile 63 of a shape to provide openings for the tubes, and the ends of the tubes may be caulked so as to provide air-tight joints where the tubes pass through the walls. Each tube preferably contains a "corebuster" 64 which may be made of a refractory rod provided with legs 65 by which the rod is supported within the tube spaced from the walls thereof. The rod occupies the center of the tube, so as to force the air past the walls in a relatively thin film, and these rods may be made up in the form of sections, the center sections being of cylindrical shape, while the end sections have rounded ends 66. The tubes in the banks 51 and 50 with which the gases first come in contact, are preferably made of a refractory material such as carborundum, which may be glazed so as to prevent oxidation. As the gases are reduced in temperature in their passes through the banks of tubes, the temperature diminishes to a point such that tubes of others materials may in some instances be employed in the last bank or banks of the group. For example, it may be found satisfactory in many instances to use ordinary cast iron tubes in the bank 48.

With the arrangement illustrated, the furnace is fired from opposite ends in alternation and arrows have been placed on Fig. 1 of the drawings to illustrate the flow of the air and gases when the furnace is fired from the end appearing at the bottom of this figure. The fuel enters through the burner 16 and air for combustion flows upwardly through the ducts 17 from the dust chamber below this end of the furnace chamber. The combustion of the fuel occurs in the furnace chamber, and the waste gases flow out at the opposite end, passing downwardly through ducts 17 into the dust chamber 18 below this end of the furnace, then passing into the regenerator 20. In this chamber the gases give up heat to the checker work and much of the solid material carried off by the bases is deposited, this regenerator chamber having means of access so that the solid material may be removed therefrom when occasion arises. The gases flow from the end of this regenerator through the ducts 20 and 23 to the branch 24, where these gases pass through the valve 26 into the duct 30. From this duct the gases pass upwardly and at right angles to the axes of the tubes in the bank 51, then flow into the chamber 53 around the end of the air chamber 42 and down past the second bank of tubes. The gases are then led to the next bank, past which they flow in an upward direction, and then they pass around the end of the chamber 44 and down through the next bank of tubes to the duct 59, leading to the stack.

Air for combustion is supplied by the blower to the air inlet chamber 45 of the recuperator, the air flowing from this chamber through the bank of tubes 48 to the chamber 44. As the gases are somewhat reduced in temperature in their flow through this bank of tubes, the consequence is that the air flowing through the tubes in the bank last encountered by the gases has a less temperature than the air flowing through the tubes first encountered. This would lead to non-uniform conditions in the air but for the fact that after passage through the bank of tubes, the air enters the chamber 44 where mixing of the air is permitted, so that uniformity in the temperature is brought about.

From the chamber 44 the air flows through the next bank of tubes in a direction at right angles to the direction of gas flow to the chamber 43, where further mixing of the air is carried on. The air then flows successively through the tubes 50, the chamber 42, the tubes 51, and chamber 41 to the duct 36, whence it is led to the valve housing 32, thence to the branch 25, ducts 23 and 22, to the regenerator 20 at the bottom of Fig. 1, the air taking up heat from the checker work in this regenerator and then flowing into the dust chamber 18 and up through flues or ducts 17 to the furnace chamber for combustion with the fuel. Owing to the fact that the air in the tubes flows in a direction transerse to that in which the gases are flowing, there is no possibility of short circuiting which would cause a reduction in the heat transfer efficiency of certain parts of the tubes and, furthermore, because of the fact that the heating of the air is brought about in a succession of stages, between which the air is allowed to intermingle, the air leaving the recuperator is of uniform temperature throughout. The use of the regenerators not only insures that the gases from the furnace chamber will be scrubbed so that the solid constituents are largely removed, but also provides a further means of heat recovery. The scrubbing of the gases prevents accumulation of solids on the outsides of the tubes and thus increases the efficiency of the heat transfer in the recuperator.

As previously described, the recuperator includes a succession of wide and narrow air chambers arranged in alternation, each of which has means of access, and the wide chambers have a width somewhat greater than the length of the tubes which connect these chambers to the next narrow chamber. With this construction, the tubes can be periodically inspected when the furnace is shut down, one workman entering the large chamber, which may be termed a replacement chamber, while another enters the narrow chamber which serves for inspection purposes. If a tube has cracked or otherwise become injured, it may be pushed out of position in the walls and into the wide chamber, from which direction the new tube is placed in position. The outside of the tubes may at that time be cleaned when required by the usual soot blower.

I claim:

1. A furnace installation comprising the combination of a furnace adapted to be fired from opposite ends in alternation, a recuperator arranged for a horizontal flow of air through ducts surrounded by combustion gases, said recuperator being adapted to effect recovery of the greater amount of the heat of waste gases generated during operation of the furnace, regenerator chambers on either side of the recuperator and adapted to effect removal of a large proportion of solid materials suspended in the said waste gases and thereby tending to maintain cleanliness in and prolong the usefulness of the recuperator, ducts connecting the air outlet and the combustion gases inlet of said recuperator to each of the said regenerators, ducts connecting the ends of the regenerators opposite to the aforementioned ends with the combustion chamber, settling chambers in the last-mentioned ducts, and means in said second named ducts for selectively connecting one of the regenerators to the air outlet end of the recuperator and the other regenerator to the gas inlet end of the recuperator.

2. A furnace installation comprising the combination of a furnace adapted to be fired from opposite ends in alternation, a recuperator arranged for a horizontal flow of air through ducts surrounded by combustion gases, said recuperator being adapted to effect recovery of the greater amount of the heat of waste gases generated during operation of the furnace, chambers on either side of the recuperator adapted to effect removal of a large proportion of solid materials suspended in the said gases and thereby tending to maintain cleanliness in and prolong the usefulness of the recuperator, ducts connecting the air outlet and the combustion gases inlet of said recuperator to each of the said chambers, ducts connecting the ends of the said chambers opposite to the aforementioned ends with the combustion chamber, settling chambers in the last-mentioned ducts, and means in said second-named ducts for selectively connecting one of the chambers first mentioned to the air outlet end of the recuperator and the other such chamber to the gas inlet end of the recuperator.

In testimony whereof I affix my signature.

WILLIAM H. FITCH.